United States Patent
Gopal et al.

(10) Patent No.: US 12,081,649 B2
(45) Date of Patent: Sep. 3, 2024

(54) ERROR RESILIENT CRYPTOGRAPHIC UNITS AND METHODS

(71) Applicant: Intel Corporation, Santa Clara, CA (US)

(72) Inventors: Vinodh Gopal, Westborough, MA (US); Kirk Yap, Westborough, MA (US)

(73) Assignee: Intel Corporation, Santa Clara, CA (US)

( * ) Notice: Subject to any disclaimer, the term of this patent is extended or adjusted under 35 U.S.C. 154(b) by 765 days.

(21) Appl. No.: 17/010,577

(22) Filed: Sep. 2, 2020

(65) Prior Publication Data

US 2020/0403779 A1    Dec. 24, 2020

(51) Int. Cl.
| | |
|---|---|
| G06F 21/64 | (2013.01) |
| G06F 11/07 | (2006.01) |
| G06F 11/10 | (2006.01) |
| H04L 9/06 | (2006.01) |
| H04L 9/32 | (2006.01) |

(52) U.S. Cl.
CPC ........ *H04L 9/0643* (2013.01); *G06F 11/0772* (2013.01); *G06F 11/1004* (2013.01); *G06F 11/1044* (2013.01); *H04L 9/0637* (2013.01); *H04L 9/3242* (2013.01)

(58) Field of Classification Search
CPC ... H04L 9/0643; H04L 9/0637; H04L 9/3242; H04L 63/12; H04L 63/123; G06F 11/0772; G06F 11/1004; G06F 11/1044; G06F 21/64; G06F 21/645
See application file for complete search history.

(56) References Cited

U.S. PATENT DOCUMENTS

| | | | |
|---|---|---|---|
| 9,524,249 B2 | 12/2016 | Chhabra et al. | |
| 9,614,666 B2 | 4/2017 | Kishinevsky | |
| 9,792,229 B2 | 10/2017 | Kishinevsky et al. | |
| 9,893,881 B2 | 2/2018 | Bhattacharyya et al. | |
| 10,303,899 B2 | 5/2019 | Durham et al. | |
| 10,594,491 B2 | 3/2020 | Durham et al. | |
| 10,657,071 B2 | 5/2020 | Durham et al. | |
| 2005/0074116 A1* | 4/2005 | Hall .................. | H04L 9/0643 |
| | | | 380/37 |
| 2008/0226063 A1 | 9/2008 | Hall et al. | |

(Continued)

FOREIGN PATENT DOCUMENTS

JP    2013-114534 A    6/2013

OTHER PUBLICATIONS

International Search Report and Written Opinion, PCT App. No. PCT/US21/42072, May 4, 2022, 10 pages.

(Continued)

*Primary Examiner* — Malcolm Cribbs
(74) *Attorney, Agent, or Firm* — Nicholson De Vos Webster & Elliott LLP

(57) ABSTRACT

An apparatus of an aspect includes an encryption unit to receive unencrypted data. The encryption unit is to encrypt the unencrypted data to generate encrypted data. The apparatus also includes circuitry coupled with the encryption unit. The circuitry is to generate a first checksum for a copy of the unencrypted data, generate a second checksum for a copy of the encrypted data, and combine the first and second checksums to generate a first value.

18 Claims, 7 Drawing Sheets

(56) References Cited

U.S. PATENT DOCUMENTS

| | | | |
|---|---|---|---|
| 2010/0146274 A1* | 6/2010 | Naslund | H04L 9/06 |
| | | | 713/168 |
| 2014/0026021 A1* | 1/2014 | Hill | G06F 11/1004 |
| | | | 714/E11.032 |
| 2015/0371058 A1 | 12/2015 | Mattsson | |
| 2017/0230175 A1 | 8/2017 | Feliciano | |
| 2019/0166107 A1 | 5/2019 | Aluvala et al. | |

OTHER PUBLICATIONS

Advanced Micro Devices, "AMD SEV-SNP: Strengthening VM Isolation with Integrity Protection and More", White Paper, Jan. 2020, pp. 1-20.

Advanced Micro Devices, "Secure Encrypted Virtualization API—Version 0.24", Revision 3.24, Technical Preview, Apr. 2020, 122 pages.

Advanced Micro Devices, "SEV Secure Nested Paging Firmware ABI Specification", Revision: 0.7, Apr. 2020, 106 pages.

Kaplan et al., "AMD Memory Encryption", White Paper, Apr. 21, 2016, 12 pages.

Natale et al., "A Novel Parity Bit Scheme for SBOX in AES Circuits", Design and Diagnostics of Electronic Circuits and Systems, Apr. 16, 2007, pp. 267-271.

International Preliminary Report on Patentability, PCT App. No. PCT/US2021/042072, Mar. 16, 2023, 6 pages.

* cited by examiner

ERROR RESILIENT ENCRYPTION METHOD 220

- 221 — RECEIVE UNENCRYPTED DATA (E.G., BEING STORED TO MEMORY BY A CPU)
- 222 — GENERATE FIRST CHECKSUM FOR COPY OF UNENCRYPTED DATA
- 223 — ENCRYPT UNENCRYPTED DATA TO GENERATE ENCRYPTED DATA
- 224 — GENERATE SECOND CHECKSUM FOR COPY OF ENCRYPTED DATA
- 225 — COMBINE FIRST AND SECOND CHECKSUMS TO GENERATE A CHECKSUM COMBINATION
- 226 — OUTPUT ENCRYPTED DATA AND CHECKSUM COMBINATION (E.G., STORE THEM TO MEMORY)

FIG. 2

ERROR RESILIENT CRYPTOGRAPHIC UNITS AND METHODS

BACKGROUND

Technical Field

Embodiments described herein generally relate to data processing. In particular, embodiments described herein generally relate to error detection in data processing.

Background Information

Data stored in memory as plaintext may be susceptible to inspection or snooping by others. This may lead to passwords, personal information, secret keys, or other secret information being revealed. It is increasingly desirable to be able to encrypt at least some of the data stored in memory to help keep it confidential.

Full memory encryption techniques have been developed in which substantially all data stored to memory is encrypted, and substantially all data loaded from memory is decrypted. Partial memory encryption techniques have also been developed in which a subset of data stored to memory may be selectively encrypted, and that subset may be decrypted when it is loaded from memory. Examples of such techniques are Intel® Software Guard Extensions (Intel® SGX), Intel Total Memory Encryption (TME), Intel Multi-Key Total Memory Encryption (MKTME), AMD Transparent Secure Memory Encryption (TSME), AMD Secure Memory Encryption (SME), AMD Secure Encrypted Virtualization (SEV). TME and TSME are essentially full memory encryption techniques and use a single key. SGX, MKTME, and SEV are partial memory encryption techniques that use multiple keys. By way of example, MKTME allows trust domains, and SEV allows virtual machines, to selectively specify which pages are to be cryptographically protected, for example, through bits in page tables, an upper bit in the memory addresses, etc.

These and other techniques known in the art typically utilize a predominantly hardware cryptographic unit to perform the encryption and decryption.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of an error resilient encryption method.

DETAILED DESCRIPTION OF EMBODIMENTS

In the following description, numerous specific details are set forth (e.g., specific checksum techniques, encryption techniques, combinational logic, system configurations, sequences of operations, etc.). However, embodiments may be practiced without these specific details. In other instances, well-known circuits, structures, and techniques have not been shown in detail to avoid obscuring the understanding of the description.

Figure 1:
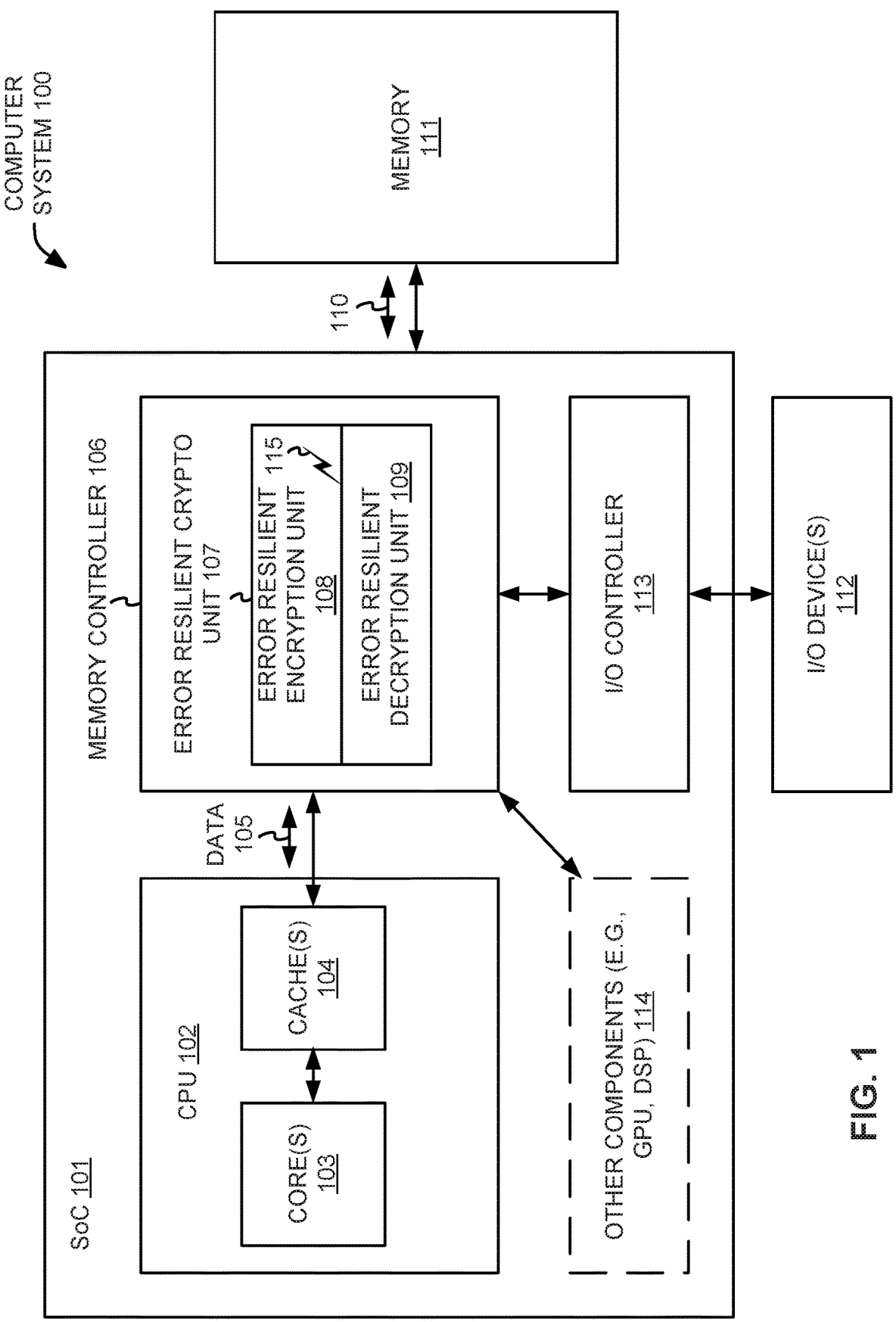
FIG. 1 is a block diagram of an embodiment of a computer system in which embodiments of the invention may be implemented.

FIG. 1 is a block diagram of an embodiment of a computer system 100 in which embodiments of the invention may be implemented. In various embodiments, the computer system may represent a server, a personal computer (e.g., a desktop computer or a laptop computer), a smartphone, a network device, or other type of computer system.

The computer system 100 includes a central processing unit (CPU) 102, a memory controller 106, a memory 111, an input and/or output (I/O) controller 113, one or more I/O devices 112, and optionally one or more other components 114. In some embodiments, the CPU, the memory controller, the I/O controller, and the other components 114 may optionally be disposed on a system-on-chip (SoC) 101 or other integrated circuit die or chip. Alternatively, these components may optionally be disposed on two or more chips.

The CPU 102 includes one or more cores 103. During operation, the cores may execute instructions to exchange data with the memory 111. For example, the cores may execute various types of load instructions to load data from the memory, and various types of store instructions to store data to the memory.

The CPU 102 also includes one or more caches 104 at one or more cache levels. For example, each core may have a dedicated level 1 (L1) cache closest to the cores, the cores may share a last level cache (LLC) farthest from the cores, and there may optionally be one or more intervening caches at one or more cache levels. During operation, the cache(s) may cache or store at least some of the data exchanged with the memory.

The CPU 102 is coupled with the memory 111 through the memory controller 106. The memory controller provides an interface for the CPU and/or its cache(s) to exchange data with the memory. In some embodiments, the I/O device(s) 112, such as communication devices (e.g., network adapters or modems), mass storage devices (e.g., hard disk drives), and other I/O devices, may also be coupled with the memory controller through the I/O controller 113 to exchange data with the memory. In some embodiments, other components 114 (e.g., a graphics processing unit (GPU), a digital signal processor (DSP), or a coprocessor) may also be coupled with the memory controller to exchange data with the memory.

The memory 111 represents main system memory and may include one or more types of memory provided by one or more memory devices. The different types of memory used for servers and personal computers should generally be suitable. Commonly used types of memory include, but are not limited to, random access memory (RAM) such as dynamic random-access memory (DRAM), static random-access memory (SRAM), synchronous dynamic random-access memory (SDRAM), and non-volatile memory such as flash memory.

Referring again to FIG. 1, an error resilient cryptographic unit 107 is included on the path to memory. As shown, the error resilient cryptographic unit may optionally be included in the memory controller 106. In other embodiments, the error resilient cryptographic unit may instead be outside the memory controller coupled along the path to the memory.

The error resilient cryptographic unit includes an error resilient encryption unit 108 and an error resilient decryption unit 109. The error resilient encryption unit may be operative to encrypt at least some data 105 (e.g., being stored to the memory by the CPU 102) to generate corresponding encrypted data 110 that is stored in the memory. The error resilient decryption unit may be operative to decrypt the encrypted data 110 (e.g., being read from the memory by the CPU 102) to regenerate the data 105. Without limitation, this may be in conjunction with performing various full or partial memory encryption techniques (e.g., SGX, TME, MKTME, SME, TSME, SEV). In some cases (e.g., in SEV), the cryptographic unit may potentially use an upper bit in the memory addresses to determine whether or not to encrypt and decrypt the data. Advantageously, such encryption and decryption may help to keep the data confidential to help prevent secret information from being revealed.

Now, one challenge is that occasionally an error 115 may occur within the error resilient cryptographic unit 107 while data is being encrypted and/or decrypted. For example, this may be due to one or more soft errors and/or hard errors. A soft error may represent a transient bit flip caused by cosmic radiation striking the cryptographic unit, a defect in hardware, a latent fault, a timing imperfection, device aging, or a combination thereof. A hard error may represent a stuck bit stuck at a particular binary value caused by a defect in hardware, latent faults, aging, or a combination thereof. Changing even a single intermediate bit through the process of encryption and/or decryption may result in many output bits changing thereby magnifying the impact of the error. Such errors may cause the cryptographic unit to generate encrypted or unencrypted data that is erroneous. For example, encrypted data may be erroneous if it is cryptographically inconsistent with its associated unencrypted data (e.g., since due to the error the encrypted data cannot be decrypted to regenerate the unencrypted data). While such errors generally occur infrequently, the relatively large amount of memory traffic found in many modern computer systems may tend to increase the likelihood of such errors occurring. Also, when deployed at large scale (e.g., in large scale server systems), even infrequent events may occur more frequently than desired.

If undetected, such errors (e.g., error 115) could lead to silent data corruption and erroneous computation and data loss. Parity bits and/or an error correction code (ECC) typically cannot be used to protect against such errors, since such parity bits and/or ECC may become invalid when the data is cryptographically transformed (e.g., they typically protect the data only before or after transformation, but not during the transformation). Redundant software computations could potentially be used if the encryption were software visible (e.g., is performed through instruction set architecture (ISA) level cryptographic instructions such as Intel® Advanced Encryption Standard (AES) New Instructions (Intel® AES-NI), but this is not an option when the cryptography is not performed by software but rather by a hardware based cryptographic unit such as those used in SGX, TME, SME, SEV, MKTME, and the like. Even when the encryption is software visible, it is sometimes not practical to perform such redundant software computations. Hardware redundancy (e.g., having two duplicate cryptographic units and comparing their outputs to make sure they match) could possibly be used to detect errors occurring within the cryptographic units themselves, but typically has drawbacks such as increased manufacturing cost, size on die, and power consumption. A resilient encryption circuit could also employ a computational technique to check for errors internally at a finer granularity between intermediate operations inside the cryptographic unit. For example, AES and other encryptions typically involve a combinations of operations (e.g., linear and non-linear transformations) used at each of multiple iterations. The resilient encryption circuit may use logic to check for errors after these internal operations for each of the iterations. These checks are performed on intermediate data in the process of being encrypted (e.g., after some operations but not all operations have been performed, after some iterations but not all iterations have been performed), not based on unencrypted input to the overall encryption unit or fully encrypted data output from the overall encryption unit. Advantageously, as will be described further below, the error resilient cryptographic unit 107 may be operable to detect errors, even if the errors occur internally within the error resilient cryptographic unit itself, which may help to prevent silent data corruption and erroneous computation.

FIG. 2 is a block flow diagram of an embodiment of an error resilient encryption method 220. In some embodiments, the method may be performed by and/or with the error resilient encryption unit 108 of FIG. 1. Alternatively, the method 220 may be performed by and/or within a similar or different error resilient encryption unit, integrated circuit, or other apparatus.

Unencrypted data may be received, at block 221. In some embodiments, the unencrypted data may be received from a CPU that is storing the unencrypted data to memory. A first checksum may be generated for a copy of unencrypted data, at block 222. In various embodiments, the first checksum may be one or more parity bits, a cyclic redundancy check (CRC), or a cryptographic hash. The unencrypted data may be encrypted to generate encrypted data, at block 223. A second checksum may be generated for a copy of the encrypted data, at block 224. In various embodiments, the second checksum may be one or more parity bits, a CRC, a cryptographic hash, or a message authentication code (MAC). As will be discussed further below, the first checksum generated at block 222 for the unencrypted data (e.g., prior to the encryption at block 223), and the second checksum generated at block 224 for the encrypted data (e.g., after the encryption at block 223) may be used to detect errors that occur during the encryption at block 223. The first and second checksums may be combined to generate a checksum combination (e.g., value), at block 225. In some embodiments, the checksum combination may have a number of bits that is less than sum of a number of bits of the first checksum plus a number of bits of the second checksum (e.g., about the same number of bits each of the first and second checksums or a largest one of them). The encrypted data and the checksum combination may be output, at block 226. In some embodiments, the encrypted data and the checksum combination may be stored to memory. Advantageously, storing the checksum combination, which in some embodiments has less bits than the sum of the number of bits of the first and second checksums, may help to reduce the amount of error detection data that needs to be stored.

Figure 3:
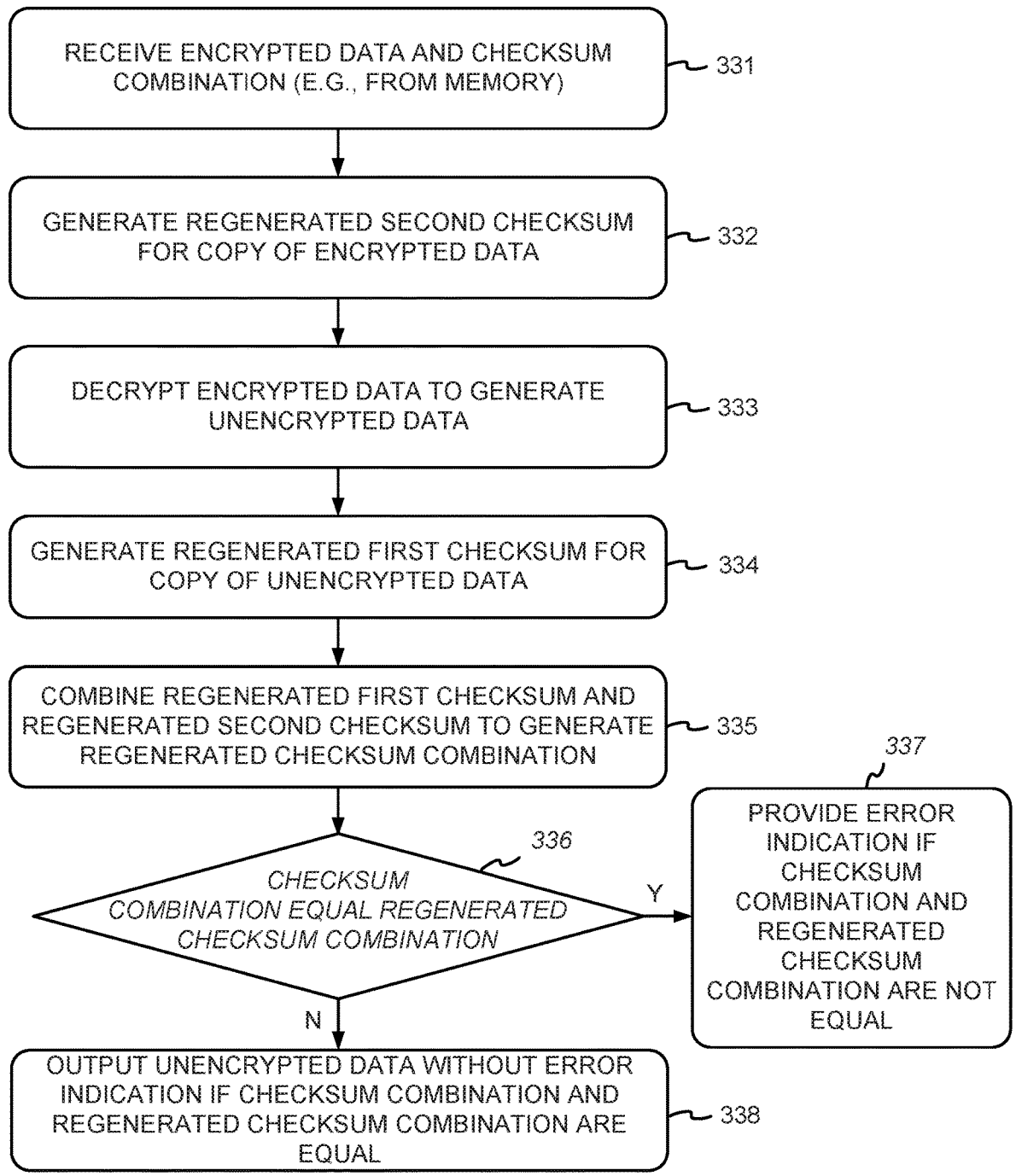
FIG. 3 is a block flow diagram of an embodiment of an error resilient decryption method.

FIG. 3 is a block flow diagram of an embodiment of an error resilient decryption method 330. In some embodiments, the method may be performed by and/or with the error resilient decryption unit 109 of FIG. 1. Alternatively, the method may be performed by and/or within a similar or different error resilient decryption unit, integrated circuit, or other apparatus.

Encrypted data and a checksum combination may be received, at block 331. In some embodiments, the encrypted data and the checksum combination may be received from memory when the encrypted data is being loaded from memory by a CPU. A regenerated second checksum may be generated for a copy of the encrypted data, at block 332. In some embodiments, the regenerated second checksum may be generated in the same way (e.g., using the same technique) as used to generate the second checksum in block 224 of FIG. 2, such that the regenerated second checksum should match the second checksum if there have been no changes or errors to the associated data and checksums. The encrypted data may be decrypted to generate unencrypted data, at block 333. A regenerated first checksum may be generated for a copy of the unencrypted data, at block 334. In some embodiments, the regenerated first checksum may be generated in the same way (e.g., using the same technique) as used to generate the first checksum in block 222 of FIG. 2, such that the first checksum and the regenerated first checksum should match if there have been no changes or errors to the associated data and checksums.

The regenerated first checksum and the regenerated second checksum may be combined to generate a regenerated checksum combination, at block 335. In some embodiments, the regenerated first checksum and the regenerated second checksum may be combined in the same way (e.g., using the same technique) as used to combine the first and second checksums in block 225 of FIG. 2, such that the regenerated checksum combination and checksum combination should match if there have been no changes or errors to the associated data and checksums. The checksum combination and the regenerated checksum combination may be compared, at block 336. If the comparison indicates that the checksum combination and the regenerated checksum combination are not equal, then an error indication may be provided, at block 337. Conversely, if the comparison indicates that the checksum combination and the regenerated checksum combination are equal, then the unencrypted data may be output (e.g., to a CPU) without providing the error indication, at block 338.

The methods of FIGS. 2-3 have been described in a relatively basic form, but operations may optionally be added to and/or removed from the methods. In addition, while the flow diagrams show an exemplary order of operations according to embodiments, that order is exemplary. Alternate embodiments may perform certain of the operations in different order, combine certain operations, overlap certain operations, etc.

Figure 4:
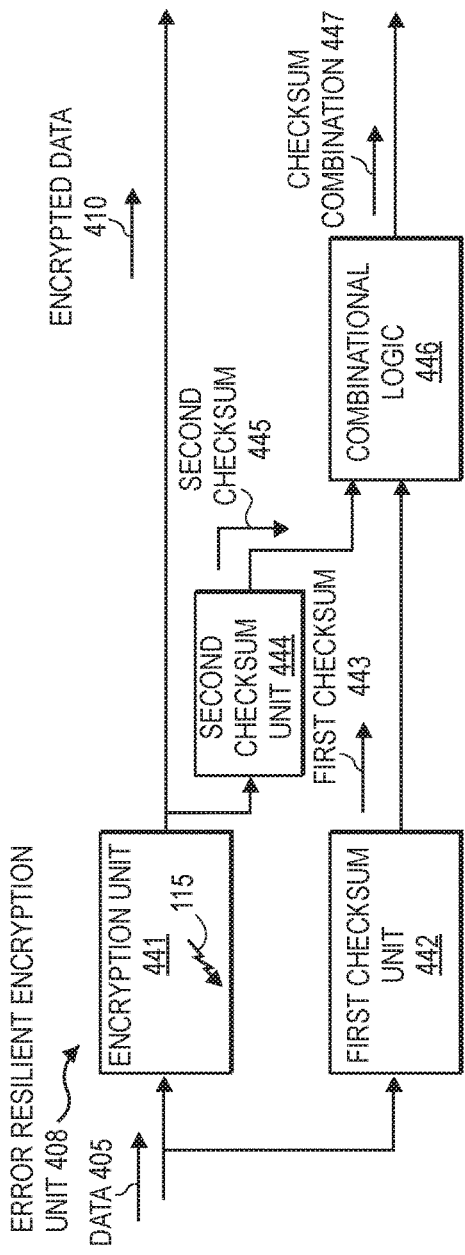
FIG. 4 is a block diagram of an embodiment of an error resilient encryption unit.

FIG. 4 is a block diagram of an embodiment of an error resilient encryption unit 408. In some embodiments, the error resilient encryption unit 408 may optionally be used as the error resilient encryption unit 108 in the computer system of FIG. 1. Alternatively, the error resilient encryption unit 408 may optionally be used in a different computer system.

The error resilient encryption unit 408 includes an encryption unit 441, a first checksum unit 442, a second checksum unit 444, and a combinational logic 446. In some embodiments, each of these components may be implemented at least partly but typically predominantly in hardware (e.g., transistors, digital logic gates, circuit elements, integrated circuitry, or the like, or a combination thereof), potentially combined with some firmware (e.g., persistent or non-volatile on-die memory storing microcode, microoperations, or other lower-level instructions/operations) and/or some software (e.g., higher-level instructions stored in memory).

The encryption unit 441 is coupled to receive unencrypted or plaintext data 405. In some embodiments, the encryption unit may be coupled along a path to memory (e.g., coupled with internal circuitry of a memory controller) to receive a cache line or other amount of data being stored to memory (e.g., as part of a full or partial memory encryption technique), although the scope of the invention is not so limited.

The encryption unit is configured or operable (e.g., has encryption circuitry or other logic) to encrypt the unencrypted data 405 to generate an encrypted data 410. The encryption unit may use any of various encryption techniques to encrypt the data. Examples of suitable techniques include, but are not limited to, Advanced Encryption Standard (AES), Rivest-Shamir-Adleman (RSA), Data Encryption Standard (DES), Triple Data Encryption Standard (3DES), SM4, Rivest Cipher 4 (RC4), block/stream ciphers, and any techniques developed in the future to replace such techniques. In one example embodiment, AES may be used. Commonly, the encryption technique (e.g., AES, DES, etc.) may also be used in various encryption modes, such as, for example, cipher block chaining (CBC), counter (CTR), cipher feedback (CFB), output feedback (OFB), xor-encrypt-xor (XEX)-based tweaked-codebook mode with ciphertext stealing (XTS). In some embodiments, the encryption unit may optionally encrypt the data based on additional context (e.g., the encryption may include a tweak based on a memory address associated with the data), such as in AES-XTS.

Referring again to FIG. 4, the first checksum unit 442 is coupled to receive a copy of the unencrypted data 405. The first checksum unit is configured or operable (e.g., has checksum circuitry or other logic) to generate a first checksum 443 for the unencrypted data 405.

The second checksum unit 444 is coupled with an output of the encryption unit 441 to receive a copy of the encrypted data 410. The second checksum unit is configured or operable (e.g., has checksum circuitry or other logic) to generate a second checksum 445 for the encrypted data 410.

As used herein, the checksums broadly represent values (typically much smaller than the original data) that may be used to verify that the data for which they were generated has not been changed and does not have an error. This is sometimes referred to as verifying the integrity of the data. Often, this may include determining whether the data and its associated checksum are consistent with one another. By way of example, the data may be used to generate a new checksum, and then the new checksum and the original checksum may be compared for equality. If the data and the original checksum do not have errors, and have not been changed, then the new checksum typically should equal or match the original checksum. Conversely, if the data or the original checksum have an error, or have been changed, then the new checksum typically should not equal or match the original checksum.

Notice that the first checksum 443 is generated for and/or based on the unencrypted data 405. The first checksum is useful to verify the integrity of the unencrypted data. Notice also that the second checksum 445 is generated for and/or based on the encrypted data 410. The second checksum is useful to verify the integrity of the encrypted data. As will be discussed further below, the two checksums generated for and/or based on the data both before encryption and after decryption may be used to provide resiliency against errors (e.g., soft errors and hard errors) that may occur within the encryption unit.

The first and second checksum units 442, 444 may be configured or operable to use any of a wide variety of different types of checksum techniques to generate the first and second checksums 443, 445, respectively. The techniques may either be the same or different.

In a first example embodiment, the first and/or second checksum units may have parity bit generation circuitry or other logic to generate one or more parity bits from the data as a checksum. As few as a single parity bit may be used to provide limited ability to detect errors or changes to the data, or two, three, four, or more parity bits may optionally be used to enhance the ability to detect errors or changes to the data.

In a second example embodiment, the first and/or second checksum units may have cyclic redundancy check (CRC) circuitry or other logic to generate a CRC from the data as a checksum. Examples of suitable CRC's include, but are not limited to, 8-bit, 16-bit, 32-bit, or 64-bit CRCs generated using various polynomials.

In a third example embodiment, the first and/or second checksum units may have cryptographic hash circuitry or other logic to generate a cryptographic hash of the data as a checksum. Examples of suitable cryptographic hash techniques include, but are not limited to, Secure Hash Algorithm 1 (SHA-1), Secure Hash Algorithm 2 (SHA-2), Secure Hash Algorithm 3 (SHA-3), MD5 message-digest algorithm, SM3 hash algorithm, RACE Integrity Primitives Evaluation Message Digest (RIPEMD), Whirlpool, others known in the arts, and techniques developed in the future to replace such techniques. The hashes or hash values generated from such techniques are also sometimes referred to in the arts as digests.

In a fourth example embodiment, the first and/or second checksum units may have message authentication code (MAC) generation circuitry or other logic to generate a MAC from the data as a checksum. The MAC may represent any suitable MAC involving and a secret cryptographic key. The MAC may be considered an encrypted or cryptographically protected checksum. In addition to verifying integrity (e.g., that data does not have errors and has not been changed), MACs also allow the authenticity of the data to be verified (e.g., that the data came from an entity having the secret key needed to generate the MAC from the associated data). Any change to the data or the secret key should result in a different MAC being generated. No entity without access to the secret key should be able to generate the MAC. If a regenerated MAC matches an original MAC, it may be inferred that the data has not changed, and that the data came from the entity having access to the secret key.

In a fifth example embodiment, the first and/or second checksum units may have keyed-hash MAC (HMAC) generation circuitry or other logic to generate an HMAC from the data as a checksum. An HMAC is also sometimes referred to as a hash-based MAC. The HMAC may represent any suitable MAC involving a cryptographic hash technique as well as a secret cryptographic key. Suitable cryptographic hash techniques include, but are not limited to, SHA-1, SHA-2, SHA-3, MD5, and RACE Integrity Primitives Evaluation Message Digest (RIPEMD), and cryptographic hashes developed in the future as replacements/substitutes for these. The cryptographic strength of the HMAC depends upon factors such as the cryptographic strength of the hash function, the size of the hash, and the size and quality of the key, and such factors may be suitably selected for the particular implementation to provide the desired level of security. Still other embodiments may optionally use a KECCAK MAC (KMAC) based on SHA-3, a cipher-based MAC (CMAC), a one-key MAC (OMAC), a cipher block chaining MAC (CBC-MAC), a CCM mode (Counter with CBC-MAC) which combines a CBC-MAC with a counter mode of encryption, and a Galois Counter Mode MAC (GMAC), and a parallelizable MAC (PMAC).

In a sixth example embodiment, the first and/or second checksum units may have error correcting code (ECC) or cyclic ECC circuitry or other logic to generate an error correcting code (ECC) or cyclic ECC from the data as a checksum. Illustrative examples of suitable ECCs include, but are not limited to, Hamming codes and Bose-Chaudhuri-Hocquenghem (BCH) cyclic ECCs.

The scope of the invention is not limited to any known combination of such different types of checksums. Almost any combination of these types of checksums, or other types of checksums known in the art, should generally be suitable. The specific checksums selected for a given implementation may depend on various factors, such as, for example, the desired level of error detection, the desired level of security, and whether it is desirable to support authentication. In embodiments where lower levels of error detection are needed and the need for authentication is not required, simpler techniques such as from one or more parity bits, shorter length CRCs (e.g., 8-bit CRCs), or the like, may optionally be used for both checksums. In other embodiments where higher levels of error detection are needed and the need for authentication is still not required, relatively longer length CRCs (e.g., 16-bit CRCs), 16-bit cryptographic hashes, or the like, may optionally be used for both checksums. In still other embodiments where even higher levels of error detection are needed and there is a need for authentication, one of the approaches may use a MAC-based approach (e.g., MAC, HMAC, KMAC, CMAC, OMAC, CCM, GCM, PMAC, or other cryptographically strong MAC), whereas another of the approaches may use CRC of more than 16-bits, a cryptographic hash of more than 16-bits, a MAC, or an ECC. Commonly, the MAC will be computed for the encrypted data (e.g., rather than only the unencrypted data), since this is recommended for certain cryptographic standards. Those skilled in the art and having the benefit of the present disclosure will appreciate that there are numerous combinations of techniques to generate the first and second checksums depending upon the goals of the particular implementation.

Referring again to FIG. 4, the combinational logic 446 is coupled with an output of the first checksum unit 442 to receive the first checksum 443. The combinational logic is also coupled with an output of the second checksum unit 444 to receive the second checksum 445. The combinational logic is configured or operable (e.g., has circuitry or other logic) to combine the first checksum and the second checksum to generate a checksum combination 447. As used herein, the checksum combination broadly represents a value or set of bits representing a logical, arithmetical, cryptographic, or other such combination of the values or bits of the first and second checksums. In some embodiments, the checksum combination may have a number of bits that is at least less than a number of bits of the first checksum plus a number of bits of the second checksum. In some embodiments, the checksum combination may have a number of bits that is no more than a number of bits of a largest one of the first and second checksums having a largest number of bits.

A wide variety of different types of combinational logic or circuitry may optionally be used. In some embodiments, the combinational logic or circuitry may optionally include an array of logic gates, including a different logic gate for each corresponding pair of bits (e.g., bits in the same bit positions) of the first and second checksums to be combined. Examples of suitable types of logic gates include, but are not limited to, AND gates, OR gates, exclusive OR (XOR) gates, inverted AND (NAND) gates, inverted OR (NOR) gates, and exclusive inverted OR (XNOR) gates. Each logic gate may implement a Boolean function or other logical operation on one or more binary inputs (e.g., a pair of corresponding bits from the first and second checksums) to produce a single binary output (e.g., a single bit). In other embodiments, the combinational logic or circuitry may optionally include an array of a set of multiple types of logic gates, including a set of multiple types of logic gates for each corresponding pair of bits of the first and second checksums to be combined. In other embodiments, the combinational logic may optionally include an adder or subtractor. Commonly to avoid increasing the number of bits in the checksum combination, the adder or subtractor may be a modulo adder or subtractor where the addition is performed modulo the desired size of the checksum combination (e.g., a largest one of the first and second checksums or some other desired size). Such adders and subtractors are constructed from combinational logic and as used herein are considered combinational logic. In still other embodiments, a CRC, a cryptographic hash, or other cryptographic technique may optionally be used to combine the first and second checksums.

There are at least two potential advantages to combining the first and second checksums into the combined checksum. One possible advantage is to reduce the number of checksum bits (e.g., that need to be stored in memory or transmitted on a communication channel) while still providing the error resiliency described herein. For example, storing both the full first checksum and the full second checksum in memory may tend to be expensive. Consider for example a 512-bit cache line being stored to memory. If two 32-bit checksums are stored along with the 512-bit cache line, they may amount to about 11% (e.g., 64/576) of all the data stored. In contrast, if the two 32-bit checksums are combined into a single 32-bit combined checksum, it may amount to only about 6% (e.g., 32/544) of all the data stored. Also, certain implementations already commonly store the second checksum 445 to memory when data is stored to memory, so storing the checksum combination if it is not significantly larger than the second checksum may not significantly increase the amount of error detection data stored, while preserving the ability to detect errors based on both the encrypted and unencrypted data. Accordingly, in some embodiments, the checksum combination may have at least less bits than the combined number of bits of the first and second checksums. In some embodiments, the checksum combination may have no more bits than and/or the same number of bits as the largest one of the first and second checksums.

Another possible advantage to combining the first and second checksums into the combined checksum, for some embodiments, is to help to maintain the confidentiality of the unencrypted data 405. For such embodiments, one possible security concern is that an attacker may try to back out or discover the unencrypted data 405 using the first checksum 443, which is based on the unencrypted data. Combining the first checksum with the second checksum may make this harder especially since the second checksum is based on the encrypted data 410 which has been cryptographically changed from the unencrypted data. Another possible approach could be to encrypt the first checksum 405 along with the unencrypted data 405, but this may involve additional cryptographic logic and/or power consumption and also will increase the total amount of data output from the encryption unit that needs to be stored in memory.

Referring again to FIG. 4, the error resilient encryption unit 408 may output the encrypted data 410 and the checksum combination 447. In some embodiments, the error resilient encryption unit may output the encrypted data and the checksum combination to circuitry of a memory controller and they may thereafter be stored to a memory (e.g., the memory 111), although the scope of the invention is not so limited.

Figure 5:
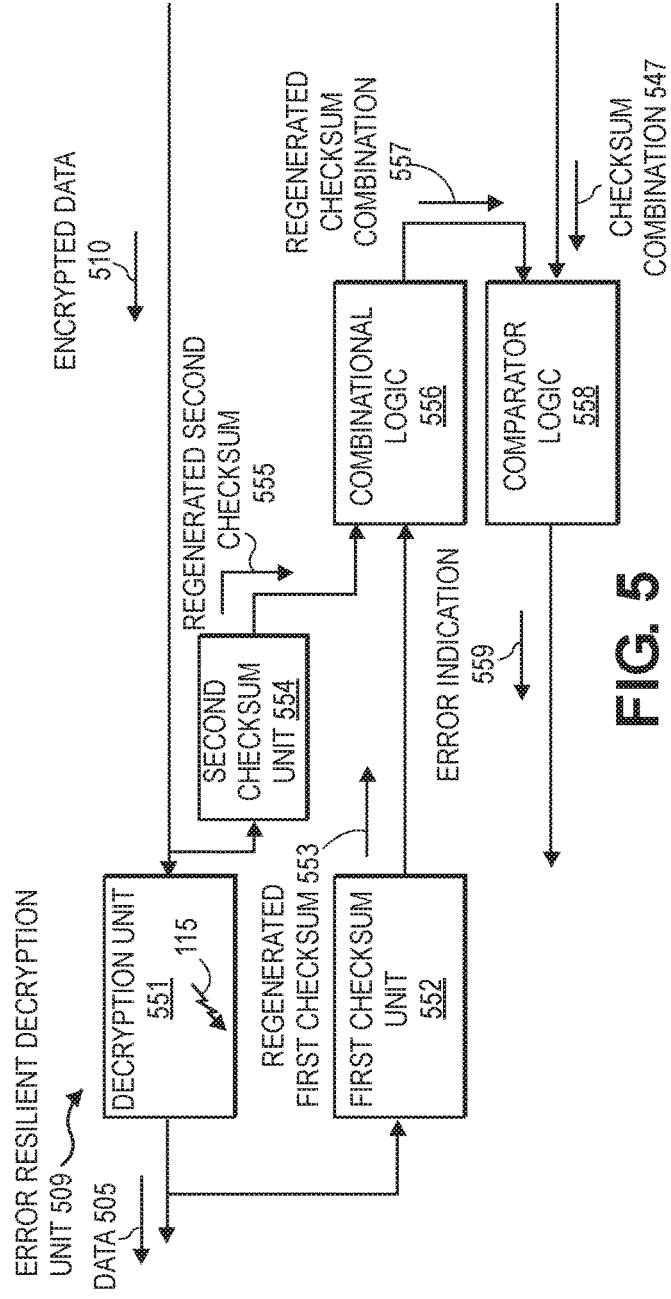
FIG. 5 is a block diagram of an embodiment of an error resilient decryption unit.

FIG. 5 is a block diagram of an embodiment of an error resilient decryption unit 509. In some embodiments, the error resilient decryption unit 509 may optionally be used as the error resilient decryption unit 109 in the computer system of FIG. 1. Alternatively, the error resilient decryption unit 509 may optionally be used in a different computer system.

The error resilient decryption unit 509 includes a decryption unit 551, a first checksum unit 552, a second checksum unit 554, a combinational logic 556, and a comparator logic 558. In some embodiments, each of these components, may be implemented at least partly but typically predominantly in hardware (e.g., transistors, digital logic gates, circuit elements, integrated circuitry, or the like, or a combination thereof), potentially combined with some firmware (e.g., persistent or non-volatile on-die memory storing microcode, microoperations, or other lower-level instructions/operations) and/or some software (e.g., higher-level instructions stored in memory).

The decryption unit 551 is coupled to receive encrypted data 510. In some embodiments, the decryption unit may be coupled along a path to memory (e.g., coupled with internal circuitry of a memory controller) to receive an encrypted cache line or other amount of encrypted data being loaded from memory, although the scope of the invention is not so limited.

The decryption unit 551 is configured or operable (e.g., has decryption circuitry or other logic) to decrypt the encrypted data 510 to generate plaintext or unencrypted data 505. The decryption unit should use the same technique (but in the direction of decryption instead of encryption) to decrypt the encrypted data that was used by the encryption unit 441 to generate the encrypted data 410. Any of the previously mentioned techniques are suitable (e.g., AES in one instance), as long as the same technique is used by both the encryption unit 441 and the decryption unit 551. An optional buffer or other temporary storage (not shown) may optionally be included to store the unencrypted data 505 until an error indication 559 is provided or a determination that no such error indication is needed, as discussed further below.

The second checksum unit 554 is coupled to receive a copy of the encrypted data 510. The second checksum unit is configured or operable (e.g., has checksum circuitry or other logic) to generate a regenerated second checksum 555 for and/or based on the encrypted data 510.

The first checksum unit 552 is coupled with an output of the decryption unit 551 to receive a copy of the unencrypted data 505. The first checksum unit is configured or operable (e.g., has checksum circuitry or other logic) to generate a regenerated first checksum 553 for and/or based on the unencrypted data 505.

Notice that the regenerated second checksum 555 is for and/or based on the encrypted data 510. Notice also that the regenerated first checksum 553 is generated for and/or based on the unencrypted data 505. The two regenerated checksums generated for and/or based on the data both before decryption and after decryption may be used to provide resiliency against errors (e.g., hard or soft error 115) that may occur within the decryption unit 551.

The first checksum unit 552 should use the same technique for the regenerated first checksum 553 as that used by the first checksum unit 443 to generate the first checksum 443, such that the first checksum 443 and the regenerated first checksum 553 should match or be equivalent when there are no errors or changes to the associated data and checksums. The second checksum unit 554 should use the same technique for the regenerated second checksum 555 as that used by the second checksum unit 444 to generate the second checksum 445, such that the second checksum 445 and the regenerated second checksum 555 should match or be equivalent when there are no errors or changes to the associated data and checksums. Any of the previously mentioned techniques are suitable.

Referring again to FIG. 5, the combinational logic 556 is coupled with an output of the first checksum unit 552 to receive the regenerated first checksum 553, and is coupled with an output of the second checksum unit 554 to receive the regenerated second checksum 555. The combinational logic is configured or operable (e.g., has circuitry or other logic) to combine the first regenerated checksum 553 and the second regenerated checksum 555 into a regenerated checksum combination 557. As used herein, the regenerated checksum combination broadly represents a value or set of bits representing a logical, arithmetical, cryptographic, or other such combination of the values or bits of the first and second checksums.

The combinational logic 556 should be of the same type, or at least be operative to generate the same outputs for the same inputs, as the combinational logic 446, so that the regenerated checksum combination 557 and the checksum combination 447 will match or be equivalent when there are no errors or changes to the associated data or checksums. Any of the previously mentioned types of combinational logic are suitable.

The error resilient decryption unit additionally includes a comparator logic 558 coupled with the output of the combinational logic 556 to receive the regenerated checksum combination 557. The comparator logic is also coupled (e.g., with internal circuitry of a memory controller, along a path to memory, etc.) to receive the checksum combination 547 provided for the encrypted data. The comparator logic may be operative (e.g., have comparison circuitry or other logic) to compare the regenerated checksum combination 557 and the checksum combination 547 to see if they match or are equivalent.

The match for equality can also include determining if values are unequal, if one value is greater than another, if one value is less than another, etc. Different types of comparison logic are suitable, such as, for example, binary logical comparators, combinational logic circuits, subtractors with zero output detection logic, and the like. One specific example of a suitable equality comparator circuit includes an exclusive NOR gate (XNOR) per pair of input bits to be compared. If the two inputs are identical (i.e., both ones or both zeroes) then logic one is output, otherwise logic zero is output if the two inputs are not identical. The outputs of the XNOR gates are then combined in an AND gate. The output of the AND gate will be logic one only when all the XNOR gates indicate that their respective inputs are matching. This is just one illustrative example.

The comparison indicating that the regenerated checksum combination 557 is equivalent to the checksum combination 547 is an indication that no error or change has occurred while generating the encrypted data 410 from the data 405, generating the first checksum 443, generating the second checksum 445, generating the checksum combination 447, storing or otherwise preserving the encrypted data 410 and the checksum combination 447 until they are later received by the error resilient decryption unit 509, generating the unencrypted data 505 from the encrypted data 510, generating the regenerated first checksum 553, generating the regenerated second checksum 555, generating the regenerated checksum combination 557, and comparing the checksum combination 547 with the regenerated checksum combination 557. In some cases, the error detection capability may depend to some extent on the error detection characteristics of the particular types of checksums implemented and the combinational logic. In such cases, the unencrypted data 510 may be output from the decryption unit (e.g., provided to a CPU) and used for further processing.

Conversely, the comparison indicating that the regenerated checksum combination 557 is not equivalent to the checksum combination 547 is an indication that something is not right and/or that an error or change has occurred at some point during the aforementioned process. For example, if a soft error or hard error 115 occurs internally in the encryption unit 441 when the unencrypted data 405 is being encrypted, then the first checksum 443 will not match the regenerated first checksum 553, thereby causing the checksum combination 547 to not match the regenerated checksum combination 557. As another example, if a soft error or hard error occurs internally in the second checksum unit 444, then the regenerated second checksum 555 will not match the second checksum 445, thereby causing the checksum combination 547 to not match the regenerated checksum combination 557.

In such cases, in some embodiments, the comparator logic 558 and/or the error resilient decryption unit 509 may provide an error indication 559 to indicate that something is not right and/or the decrypted data 505 is at least potentially erroneous. Examples of suitable error indications include, but are not limited to, asserting a signal (e.g., raising a machine check exception (MCE), or other exception, fault, or trap), associating a poison indication with the unencrypted data 505 or otherwise providing an indication that the unencrypted data 505 is at least potentially erroneous, setting a bit or value in a register, or the like. Without limitation, in some cases the computer system may attempt to, and in some cases may potentially be able to, correct the at least potentially erroneous unencrypted data without the need for a restart. In other cases, the at least potentially erroneous unencrypted data may need to be discarded and the system restarted before normal operation is able to resume. In any event, being able to detect the at least potentially erroneous data may be used to prevent silent data corruption in which the at least potentially erroneous unencrypted data can lead to corruption of additional data and/or erroneous results.

Figure 6:
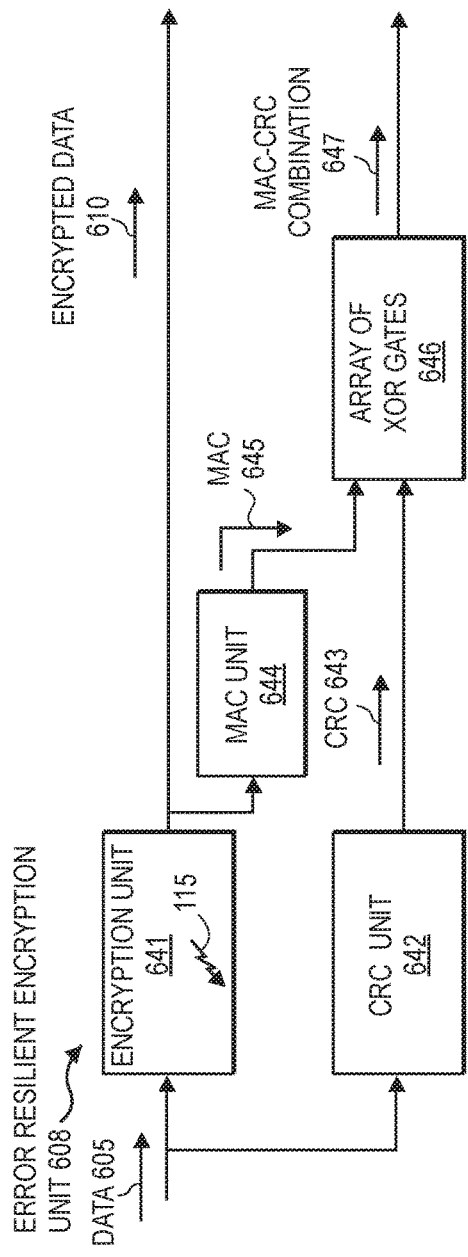
FIG. 6 is a block diagram of a detailed example embodiment of an error resilient encryption unit.

FIG. 6 is a block diagram of a detailed example embodiment of an error resilient encryption unit 608. The error resilient encryption unit includes an encryption unit 641, a CRC unit 642, a MAC unit 644, and an array of XOR gates 646. Aside from the different and/or additional aspects mentioned below, the error resilient encryption unit 608 and its components may optionally have some or all the characteristics previously described for the error resilient encryption unit 408 of FIG. 4. To avoid obscuring the description, the different and/or additional characteristics will primarily be described without repeating all the characteristics that may optionally be the same or similar to those previously described. In some embodiments, the error resilient encryption unit 608 may optionally be used as the error resilient encryption unit 108 in the computer system of FIG. 1. Alternatively, the error resilient encryption unit 608 may optionally be used in a different computer system.

The encryption unit 641 is coupled to receive unencrypted or plaintext data 605. In some embodiments, the encryption unit may be coupled along a path to memory (e.g., coupled with internal circuitry of a memory controller, coupled with a memory channel, etc.) to receive a cache line or other amount of data being stored to memory, although the scope of the invention is not so limited. The encryption unit is configured or operable (e.g., has encryption circuitry or other logic) to encrypt the unencrypted data 605 to generate an encrypted data 610. The encryption unit may use any of previously described encryption techniques to encrypt the data, such as, for example, AES.

The CRC unit 642 is coupled to receive a copy of the unencrypted data 605. The CRC unit is configured or operable (e.g., has CRC circuitry or other logic) to generate a CRC 643 for and/or based on the unencrypted data 605. The logic of the CRC unit is typically negligible compared to the encryption unit and MAC unit. The CRC 643 is an example embodiment of a checksum that is useful to verify the integrity of the unencrypted data. In some embodiments, the CRC may have at least 16-bits (e.g., between 16-bits to 32-bits inclusive) to allow for better error detection, although the scope of the invention is not so limited. Whereas a CRC is used as the checksum for the unencrypted data in this embodiment, other types of checksums may optionally be used in other embodiments.

The MAC unit 645 is coupled with an output of the encryption unit 641 to receive a copy of the encrypted data 610. The MAC unit is configured or operable (e.g., has MAC circuitry or other logic) to generate a MAC 645 for and/or based on the encrypted data 610. In various embodiments, the MAC may be a simple MAC, an HMAC, a KMAC, a CMAC, OMAC, CCM mode CBC-MAC, a GCM based MAC, or a PMAC. In one specific example, a 29-bit KMAC is used, since it provides good security, and since 29-bits is large enough to achieve the goals without unnecessarily storing more data, although this is not required. The MAC 645 is an example embodiment of an encrypted or cryptographically protected checksum that is useful to verify the integrity of the encrypted data. Whereas a MAC is used as the checksum for the encrypted data in this embodiment, other types of checksums may optionally be used in other embodiments.

An array of XOR gates 646 is coupled with an output of the CRC unit 642 to receive the CRC 643, and is coupled with an output of the MAC unit 644 to receive the MAC 645. The array of XOR gates represents an example embodiment of combinational logic. The array of XOR gates is configured or operable to use an XOR operation to combine the CRC 643 and the MAC 645 into a MAC-CRC combination 647. Representatively, the array of XOR gates may include a different XOR gate for each pair of corresponding bits (e.g., bits in the same bit positions) in the CRC and MAC. Each XOR gate may output true (e.g., binary 1) when one, but only one, of the bits of the pair of corresponding bits of the MAC and CRC is true, and output false (e.g., binary 0) when both bits of the pair of corresponding bits of the MAC and CRC are true or both bits are false. When both the MAC and CRC are the same size in bits, then the MAC-CRC combination will have the same size in bits as either one. In other cases, one of the MAC or CRC may have a larger size in bits than the other. The MAC may be more secure or random as compared to the CRC which may have relatively more information about the unencrypted data. If the CRC is larger than the MAC, then it may be desired to truncate the CRC before combining the truncated CRC with the MAC in order to help avoid passing any pure CRC bits not obfuscated by MAC bits. Conversely, if the MAC is larger, then the CRC may optionally be padded to have same the size as the MAC prior to combining them.

As previously described, one possible advantage of combining the MAC and CRC into the MAC-CRC combination is to reduce the total number of checksum bits (e.g., that need to be stored in memory), while still providing the error resiliency as described herein. As previously mentioned, storing all the bits of the MAC and all the bits of the CRC may tend to be expensive. In some embodiments, the MAC-CRC combination may have at least less bits than the sum of the bits of the MAC plus those of the CRC. In some embodiments, the MAC-CRC combination may have no more bits than and/or the same number of bits as the largest one of the MAC and CRC. In some embodiments, each of the MAC and CRC may have from about 16-bits to about 32-bits, and the MAC-CRC combination may have about the same number of bits, to provide a reasonable level of error detection, while balancing the cost of storing additional error detection bits in memory.

For some embodiments, in which maintaining security is important, another possible advantage of combining the MAC 645 and CRC 643 into the MAC-CRC combination 647, is to help maintain the confidentiality of the unencrypted data 605. The CRC is based on the unencrypted data 605. One security concern is that an attacker may try to back out or discover the unencrypted data 605 using the CRC 643. However, combining the CRC with the MAC, which is cryptographically derived from the encrypted data, may help to obscure the CRC and thereby make this much more difficult if not infeasible. If the technique for the MAC is cryptographically strong enough to create a MAC that is nearly indistinguishable from random noise, then it becomes a good mask or 1-time pad for the CRC, which itself may be considered unsafe since it is a function of the plaintext. In addition, the XOR gates, if used, through their logic operation preserve information indicating the pairs of corresponding bits in the MAC and CRC which are different, which combines the CRC with the MAC in a way that helps to better mask the CRC to help make discovering the unencrypted data from the CRC more challenging. Therefore, storing the XOR of the MAC and CRC may be nearly indistinguishable from noise. However, other types of logic gates besides XOR gates also provide masking to sufficiently obscure the CRC and may optionally be used if desired. Such arrays of logic gates generally have very minimal hardware cost, size, power consumption, and latency. If desired, modulo adders, modulo subtractors, and other combinational logic provide some level of masking and may optionally be used. Moreover, if the need for security is even greater, the MAC and the CRC may optionally be combined through a cryptographic technique, although the cost, size, power consumption, and latency will typically be greater.

The error resilient encryption unit 608 may output the encrypted data 610 and the MAC-CRC combination 647. In some embodiments, the encrypted data and the MAC-CRC combination may be stored in memory, and later retrieved from the memory together so that the MAC-CRC combination can be used to provide error resiliency to the data.

Figure 7:
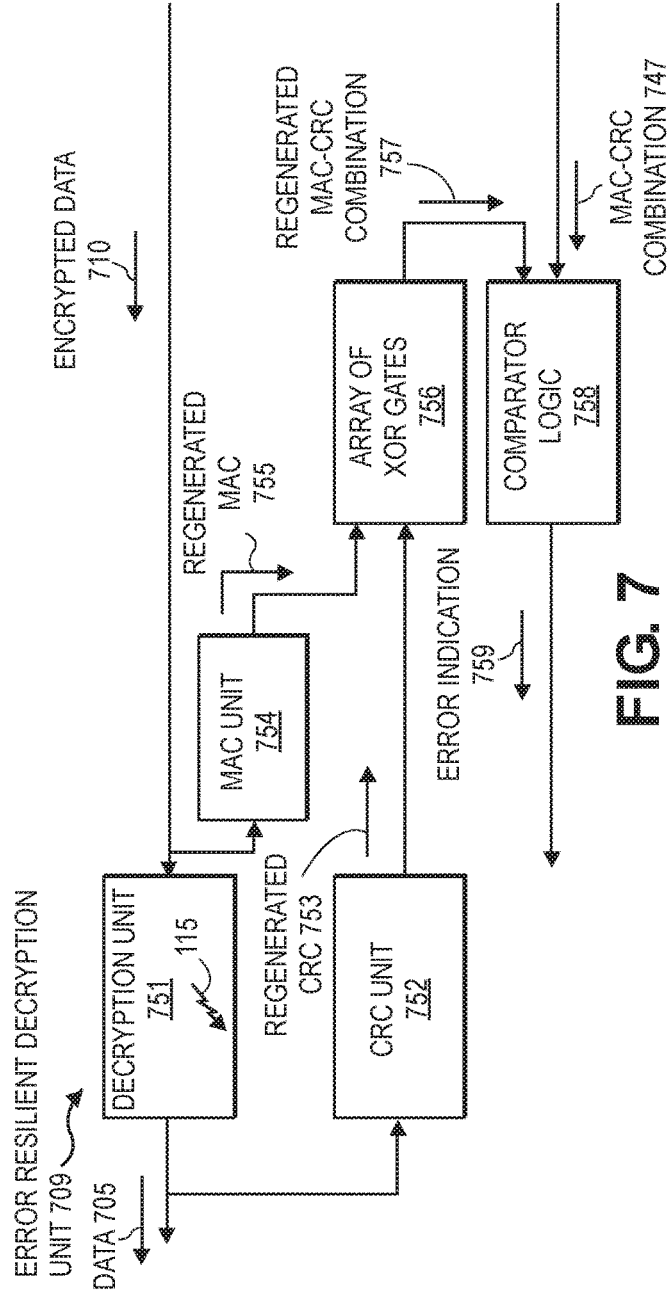
FIG. 7 is a block diagram of a detailed example embodiment of an error resilient decryption unit.

FIG. 7 is a block diagram of a detailed example embodiment of an error resilient decryption unit 709. The error resilient decryption unit includes a decryption unit 751, a CRC unit 752, a MAC unit 754, an array of XOR gates 756, and a comparator logic 758. Aside from the different and/or additional aspects mentioned below, the error resilient decryption unit 709 and its components may optionally have some or all the characteristics previously described for the error resilient decryption unit 509 of FIG. 5. To avoid obscuring the description, the different and/or additional characteristics will primarily be described without repeating all the characteristics that may optionally be the same or similar to those previously described. In some embodiments, the error resilient decryption unit 709 may optionally be used as the error resilient decryption unit 109 in the computer system of FIG. 1. Alternatively, the error resilient encryption unit 709 may optionally be used in a different computer system.

The decryption unit 751 is coupled to receive encrypted data 710. In some embodiments, the decryption unit may be coupled along a path to memory (e.g., coupled with internal circuitry of a memory controller, coupled with a memory channel, etc.) to receive an encrypted cache line or other amount of encrypted data being loaded from the memory, although the scope of the invention is not so limited.

The decryption unit 705 is configured or operable (e.g., has decryption circuitry or other logic) to decrypt the encrypted data 710 to generate plaintext or unencrypted data 705. The decryption unit should use the same cryptographic technique (but in the direction of decryption instead of encryption) to decrypt the encrypted data as that used by the encryption unit 641 to generate the encrypted data 610. Any of the previously mentioned techniques are suitable (e.g., AES), as long as the same cryptographic technique is used by both the encryption unit 641 and the decryption unit 751.

The MAC unit 754 is coupled to receive a copy of the encrypted data 710. The MAC unit is configured or operable (e.g., has MAC circuitry or other logic) to generate a regenerated MAC 755 for and/or based on the encrypted data 710. The MAC unit may generate the regenerated second checksum in parallel with the decryption unit decrypting the encrypted data, which may help to hide much of the latency for the performance impacting read path from memory. The MAC unit 754 should use the same technique and type of MAC (e.g., same KMAC, same hash technique, same KMAC size, etc.) for the regenerated MAC 755 as that used by the MAC unit 644 to generate the MAC 645, such that the MAC 645 and the regenerated MAC 755 should match or be equivalent when there are no errors or changes to the associated data and MACs. Whereas a MAC is used as the checksum for the encrypted data in this embodiment, other types of checksums may optionally be used in other embodiments, as long as the same technique and type of checksum is used for the encrypted data in both the error resilient encryption unit and the error resilient decryption unit.

The CRC unit 752 is coupled with an output of the decryption unit 751 to receive a copy of the unencrypted data 705. The CRC unit is configured or operable (e.g., has CRC circuitry or other logic) to generate a regenerated CRC 753 for and/or based on the unencrypted data 705. The CRC unit 752 should use the same technique and type of CRC (e.g., same polynomial, same CRC size, etc.) for the regenerated CRC 753 as that used by the CRC unit 642 to generate the CRC 643, such that the CRC 643 and the regenerated CRC 753 should match or be equivalent when there are no errors or changes to the associated data and CRSs. Whereas a CRC is used as the checksum for the integrity of the unencrypted data in this embodiment, other types of checksums may optionally be used in other embodiments, as long as the same technique and type of checksum is used for the unencrypted data in both the error resilient encryption unit and the error resilient decryption unit.

The array of XOR gates 756 is coupled with an output of the MAC unit 754 to receive the regenerated MAC 755, and is coupled with an output of the CRC unit 752 to receive the regenerated CRC 753. The array of XOR gates is configured or operable to combine the regenerated MAC and the regenerated CRC into a regenerated MAC-CRC combination 757. Whereas an array of XOR gates is used in this embodiment, other types of combinational logic may optionally be used in other embodiments, as long as the combinational logic used by the error resilient encryption unit and the error resilient decryption unit will both produce the same outputs (e.g., MAC-CRC combinations) for the same inputs (e.g., CRCs and MACs).

The error resilient decryption unit additionally includes a comparator logic 758 coupled with the output of the array of XOR gates 756 to receive the regenerated MAC-CRC combination 757. The comparator logic is also coupled (e.g., with internal circuitry of a memory controller, with a memory channel, etc.) to receive the MAC-CRC combination 747 provided with the encrypted data 710. The comparator logic may be operative (e.g., have comparison circuitry or other logic) to compare the regenerated MAC-CRC combination 757 and the MAC-CRC combination 747 to see if they match or are equivalent. Different types of comparison logic are suitable, such as, for example, binary logical comparators, combinational logic circuits, subtractors with zero output detection logic, and the like. One specific example includes an exclusive NOR gate (XNOR) per pair of input bits of the MAC-CRC combination and regenerated MAC-CRC combination to be compared. If the pair of input bits are identical (i.e., both ones or both zeroes) then binary one is output, otherwise a binary zero is output. An AND gate is used to combine the outputs of the XNOR gates. The output of the AND gate will be binary one only when all the XNOR gates indicate that their respective pair of input bits are matching (e.g., the MAC-CRC combination and the regenerated MAC-CRC combination are identical), and otherwise zero This is just one illustrative example.

As previously described, the comparison indicating that the regenerated MAC-CRC combination 757 is equivalent to the MAC-CRC combination 747 is an indication that no error or change has occurred. In such cases, the unencrypted data 705 may be output from the decryption unit (e.g., provided to a CPU) and used for further processing. Conversely, the comparison indicating that the regenerated MAC-CRC combination 757 is not equivalent to the MAC-CRC combination 747 is an indication that something is not right and/or that an error or change has occurred. In such a case, in some embodiments, the comparator logic 758 and/or the error resilient decryption unit 709 may provide an error indication 759 to indicate that something is not right and/or the decrypted data 705 is at least potentially erroneous. The previously mentioned types of error indications are suitable, and without limitation may be processed by the system as previously described. Advantageously, being able to detect the at least potentially erroneous data may be used to prevent silent data corruption in which the at least potentially erroneous unencrypted data can lead to corruption of additional data and/or erroneous results.

In the illustrated embodiment, in order to keep the computational latency of generating the MAC 754 out of the performance impacting read path from memory, the MAC 754 can be computed based on the encrypted data 710 rather than the unencrypted data 705. This design choice may add latency to the less performance impacting write path to memory, since the computation of the MAC 645 begins after the encryption by the encryption unit 641. However, this design allows the regenerated MAC 755 to be computed soon after the encrypted data 710 arrives on the read return path from memory. If the regenerated MAC 755 is available on the following cycle after the encrypted data 710 from system memory, then read response latency overhead due to the integrity checking can be substantially masked. More specifically this masking may optionally be realized by performing the regenerated MAC 755 computation and the MAC-CRC combination and regenerated MAC-CRC combination comparison during a final cycle of a read response pipeline where arbitration occurs. If the read response pipeline does not have an extra cycle to absorb this latency, a lazy error checking technique may optionally be used to hide this latency. In this scenario, the unencrypted data 705 may be sent to a requester (e.g., a CPU) assuming the error checking will reveal no error. If the error checking technique reveals an error, then the error indication may be used to prevent potentially corrupted data from being committed into permanent system state.

Figure 8:
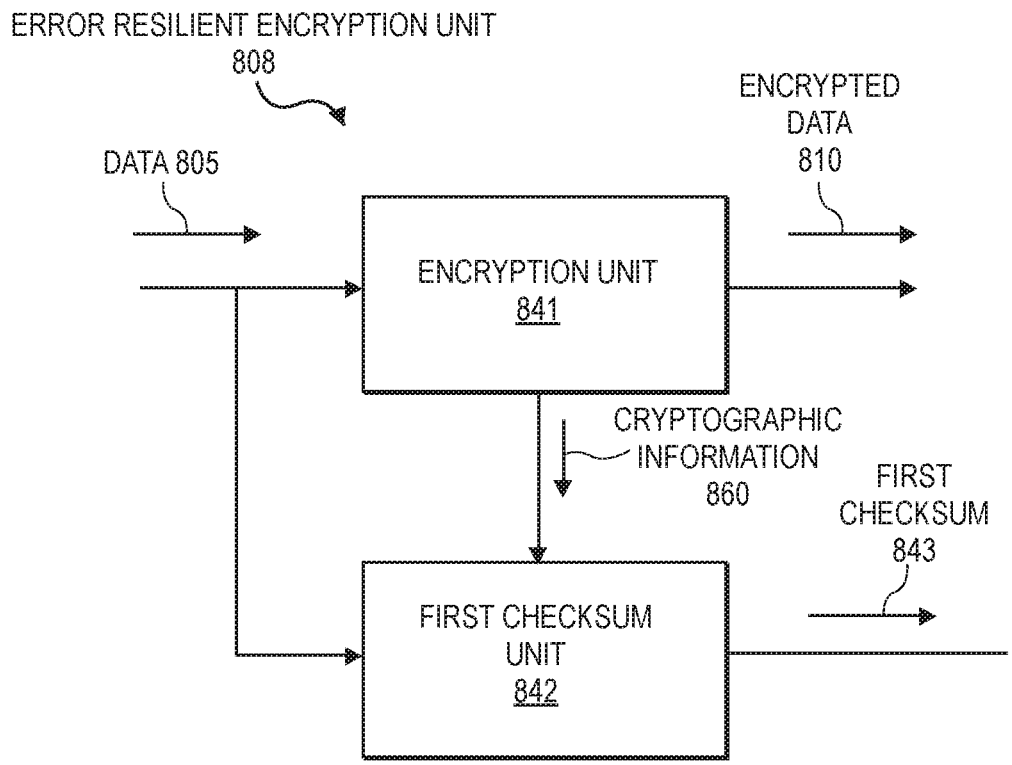
FIG. 8 is a block diagram of a portion of an error resilient encryption unit in which an encryption unit provides cryptographic information to a first checksum unit.

FIG. 8 is a block diagram of a portion of an error resilient encryption unit 808 in which an encryption unit 841 provides cryptographic information 860 to a first checksum unit 842. The encryption unit is operable to encrypt unencrypted data 805 to generate encrypted data 810, as previously described. The first checksum unit 842 receives a copy of the unencrypted data 805 and is operable to generate a first checksum 843 for the unencrypted data 805, as previously described. However, in this embodiment, the encryption unit is coupled with the first checksum unit to provide the cryptographic information 860 to the first checksum unit. The first checksum unit is operative to generate the first checksum based also on the cryptographic information. Basing the first checksum also on the cryptographic information may help to make it harder for an attacker to back out or learn the unencrypted data from the first checksum. As one example, in some embodiments, the encryption unit may use an AES-XTS technique involving encrypted address information associated with the unencrypted data that is used as a tweak to the encryption. One or more bits of the encrypted address information or tweak may be used as an embodiment of the cryptographic information 860. As another example, one or more bits but typically not all bits of a key used by the encryption unit may be used as the cryptographic information 860. Other types of cryptographic information are also contemplated.

Figure 9:
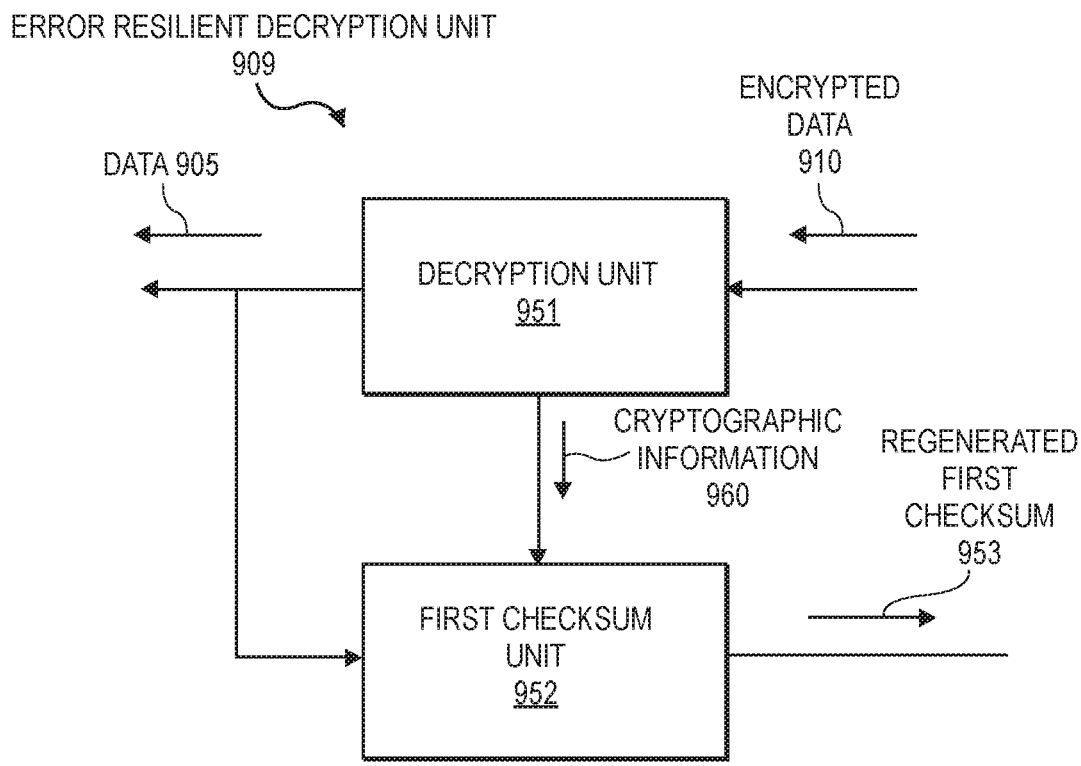
FIG. 9 is a block diagram of a portion of an error resilient decryption unit in which a decryption unit provides cryptographic information to a first checksum unit.

FIG. 9 is a block diagram of a portion of an error resilient decryption unit 909 in which a decryption unit 951 provides cryptographic information 960 to a first checksum unit 952. The encryption unit is operable to decrypt encrypted data 910 to generate unencrypted data 905, as previously described. The first checksum unit 952 receives a copy of the unencrypted data 905 and is operable to generate a regenerated first checksum 953 for the unencrypted data 905, as previously described. However, in this embodiment, the decryption unit is coupled with the first checksum unit to provide cryptographic information 960 to the first checksum unit. The first checksum unit is operative to generate the regenerated first checksum based also on the cryptographic information. The first checksum unit 952 should use the same type of cryptographic information and in the same way as used by the first checksum unit 842 so that the first checksum 843 should match the regenerated first checksum 953 if there are no errors or changes to the associated data or checksums.

In much of the description above, the error resilient encryption and decryption units have been shown and described as being distinct units substantially without any significant shared resources. This is one possible design option and may offer a potential advantage of increased concurrent throughput, since the encryption and decryption units do not need to compete for shared resources. In other embodiments, the error resilient encryption unit and the error resilient decryption unit may optionally share at least some logic, circuitry, or other resources. This may offer a potential advantage of reduced size (e.g., die area), manufacturing cost, and/or power consumption. It is to be appreciated that the error resilient encryption and decryption units may either be entirely distinct or may share some resources.

In some embodiments, a mechanism may optionally be included to enable and disable aspects of the approaches disclosed herein (e.g., turn them on and off). For example, in some embodiments, the generation of the checksum based on the unencrypted data, the combinational logic, and the comparison logic may be configured to be enable or disabled while retaining the checksum based on the encrypted data. In various embodiments, one or more configurable bits in a register may be used to enable and disable these aspects, or there may be separate mode to enable or disable these features, or there may be some other form of enable and disable mechanism.

Figure 10:
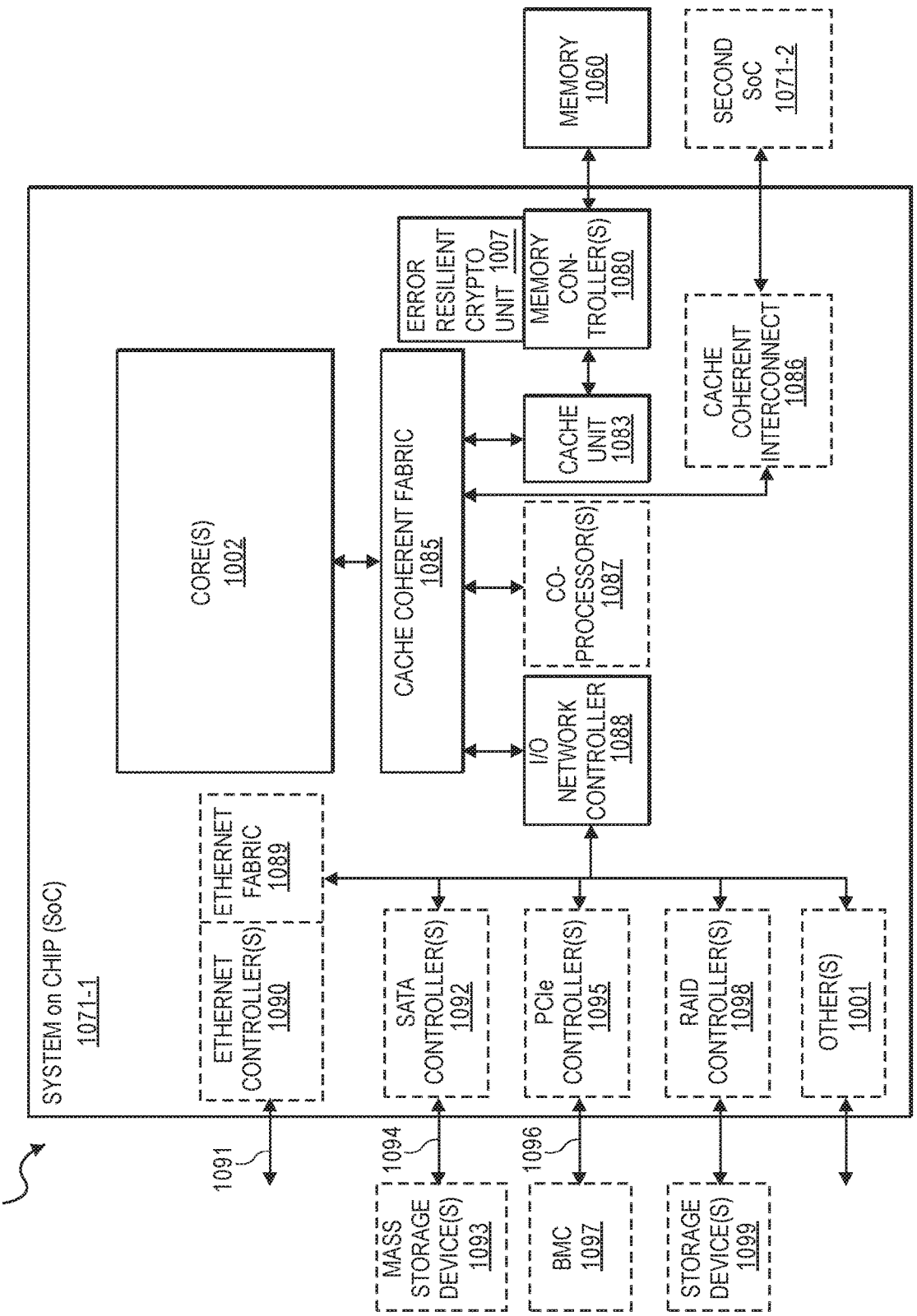
FIG. 10 is a block diagram of a detailed example embodiment of a computer system in which embodiments of the invention may be implemented.

FIG. 10 is a block diagram of an example embodiment of a computer system 1000 that includes an example embodiment of a system on chip (SoC) 1071-1 having an embodiment of an error resilient cryptographic unit 1007. In various embodiments, the computer system may be a server, such as a web server, cloud server, media server, storage server. Alternatively, the computer system may represent another type of computer system. Other embodiments pertain to the SoC alone, before it is included in the computer system. All components of the SoC may be integrated or disposed on the same chip, semiconductor die, or integrated circuit.

The SoC 1071-1 includes one or more cores 1002. The scope of the invention is not limited to any number of cores. The one or more cores are coupled with a cache coherent fabric 1085. A cache 1083 is also coupled with the cache coherent fabric. In some embodiments, each of the cores may have one or more caches at one or more cache levels.

One or more memory controllers 1080 of the SoC are coupled with the one or more cores through the cache coherent fabric and the cache unit 1083. The one or more memory controllers are coupled with memory 1060. Any of the previously described types of memory and memory controllers are suitable. In some embodiments, an error resilient cryptographic unit 1007 may be included in at least one of the memory controllers, or proximate at least one of the memory controllers. The error resilient cryptographic unit may include any of the error resilient encryption units and/or error resilient decryption units described elsewhere herein.

An optional cache coherent interconnect 1086 of the SoC may be coupled with the cache coherent fabric. In some embodiments, a second SoC 1071-2 of the computer system may optionally be coupled with the cache coherent interconnect 1086. The second SoC may optionally be similar to or the same as the SoC 1071-1. The cache coherent interconnect and the cache coherent fabric may be operative to maintain cache coherency between caches of the SoCs.

In some embodiments, one or more coprocessors 1087 may optionally be coupled with the one or more cores through the cache coherent fabric. Examples of suitable coprocessors for various different embodiments include, but are not limited to, a storage coprocessor, a network coprocessor, a packet coprocessor (e.g., a packet processing engine or a deep packet inspection accelerator), a data compression and/or decompression coprocessor, a regular-expression matching (regex) engine, a security coprocessor, a cryptographic coprocessor (e.g., a cryptography engine), and combinations thereof. In some embodiments, a coprocessor (e.g., a storage coprocessor, a network coprocessor) may optionally have an embodiment of an error resilient cryptographic unit as disclosed elsewhere herein.

An input/output (I/O) network controller 1088 may be coupled with the one or more cores through the cache coherent fabric. As shown, the I/O network controller may coupled with various other components or devices and may be operative to couple each of these components or devices with the one or more cores through the intervening cache coherent fabric.

In some embodiments, an optional Ethernet fabric 1089 (e.g., an Ethernet switch) and one or more optional Ethernet media access controllers or other controllers 1090 may optionally be coupled with the I/O network controller. In such embodiments, one or more Ethernet cables 1091 of the computer system may be coupled the one or more Ethernet MACs or other controllers. In various embodiments, the one or more Ethernet MACs or other controllers may be operative to support 10 gigabit Ethernet, 40 gigabit Ethernet, 100 gigabit Ethernet, or a combination thereof. The Ethernet cables may be operative to couple to various storage devices, a network, or the like.

In some embodiments, one or more optional Serial Advanced Technology Attachment (SATA) controllers 1092 may optionally be coupled with the I/O network controller. In such embodiments, one or more cables and one or more mass storage devices 1093 of the computer system may be coupled the one or more SATA controllers. Examples of suitable mass storage devices include, but are not limited to, one or more hard disk drives, optical drives, solid-state drives, and the like, and combinations thereof.

In some embodiments, one or more redundant array of independent disks (RAID) controllers 1098 may optionally be coupled with the I/O network controller. In such embodiments, one or more storage devices 1099 of the computer system may be coupled the one or more RAID controllers. Examples of suitable storage devices include, but are not limited to, one or more hard disk drives, solid-state drives, a storage array, or a combination. In some embodiments, a storage controller (e.g., a SATA controller, a RAID controller) may optionally have an embodiment of an error resilient cryptographic unit as disclosed elsewhere herein.

In some embodiments, one or more optional Peripheral Component Interconnect Express (PCIe) controllers 1095 may optionally be coupled with the I/O network controller. In some embodiments, the PCIe controllers may optionally be PCI Express 3.0 Base specification revision 3.0 compliant and/or PCI Express 4.0 compliant and/or PCI Express 5.0 compliant and/or PCI Express 6.0 compliant. In such embodiments, one or more PCIe buses or other interconnects of the computer system may be coupled with the one or more PCIe controllers. The PCIe interconnects may provide a serial expansion interconnect to allow one or more of various types of peripheral components or devices of the computer system to be coupled with the one or more PCIe controllers. In some embodiments, an optional baseband management controller (BMC) 1097 of the computer system may optionally be coupled with the one or more PCIe controllers. In other embodiments, a BMC may optionally be included on the SoC.

In some embodiments, one or more other components 1001 may optionally be coupled with the I/O network controller. In various embodiments, such other components may optionally include a direct memory access (DMA) controller, a universal serial bus (USB) 3.0 compliant controller, a General-purpose input/output (GPIO) controller, an Inter-Integrated Circuit ($I^2C$) controller, or a combination thereof.

Components, features, and details described for any of the encryption and/or decryption units disclosed herein (e.g., as shown in FIGS. 4-9) may optionally apply to any of the methods disclosed herein (e.g., those of FIGS. 2-3), which in embodiments may optionally be performed by and/or with such encryption and/or decryption units. The encryption and/or decryption units disclosed herein (e.g., as shown in FIGS. 4-9) may optionally be included on any of the chips disclosed herein and/or used in any of the systems disclosed herein (e.g., those of FIGS. 1 and 10).

Encryption and/or decryption units and their components may be said and/or claimed to be operative, operable, capable, able, configured adapted, or otherwise to perform an operation (e.g., combinational logic may be said and/or claimed to be operative to combine checksums). As used herein, these expressions refer to the characteristics, properties, or attributes of the components when in a powered-off state, and do not imply that the components or the encryption and/or decryption unit is currently powered on or operating. Except for in the method claims, it is to be understood that the encryption units, decryption units, systems, and other apparatus claimed herein are not claimed as being powered on or running.

In the description and claims, the terms "coupled" and/or "connected," along with their derivatives, may have be used. These terms are not intended as synonyms for each other. Rather, in embodiments, "connected" may be used to indicate that two or more components are in direct physical and/or electrical contact with each other. "Coupled" may mean that two or more components are in direct physical and/or electrical contact with each other. However, "coupled" may also mean that two or more components are not in direct contact with each other, but yet still co-operate or interact with each other. For example, a checksum unit may be coupled with an encryption unit and/or a decryption unit through one or more intervening components (e.g., a buffer). In the figures, arrows are used to show connections and couplings.

The term "and/or" may have been used. As used herein, the term "and/or" means one or the other or both (e.g., A and/or B means A or B or both A and B).

In the description above, specific details have been set forth to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein. In some embodiments, the machine-readable medium may include a tangible and/or non-transitory machine-readable storage medium. The non-transitory machine-readable storage medium does not consist of a transitory propagated signal.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is an error resilient encryption unit or other apparatus that includes an encryption unit to receive unencrypted data. The encryption unit is to encrypt the unencrypted data to generate encrypted data. The apparatus also includes circuitry coupled with the encryption unit. The circuitry is to: generate a first checksum for a copy of the unencrypted data; generate a second checksum for a copy of the encrypted data; and combine the first and second checksums to generate a first value.

Example 2 includes the apparatus of Example 1, in which the circuitry includes a first checksum unit to receive the copy of the unencrypted data. The first checksum unit is to generate the first checksum for the copy of the unencrypted data. The apparatus also includes a second checksum unit coupled with an output of the encryption unit to receive the copy of the encrypted data. The second checksum unit is to generate the second checksum for the copy of the encrypted data. The apparatus also includes combinational logic coupled with an output of the first checksum unit to receive the first checksum, and coupled with an output of the second checksum unit to receive the second checksum. The combinational logic is to combine the first and second checksums to generate the first value.

Example 3 includes the apparatus of any one of Examples 1 and 2, in which the circuitry includes one selected from a group consisting of a parity bit generation logic to generate one or more parity bits as the first checksum, a cyclic redundancy check (CRC) logic to generate a CRC as the first checksum, and a cryptographic hash logic to generate a cryptographic hash as the first checksum.

Example 4 includes the apparatus of any one of Examples 1 and 3, in which the circuitry includes a message authentication code (MAC) unit to generate a MAC as the second checksum.

Example 5 includes the apparatus of any one of Example 1, in which the circuitry includes one selected from a group consisting of a parity bit generation logic to generate one or more parity bits as the first checksum, a cyclic redundancy check (CRC) logic to generate a CRC as the first checksum, and a cryptographic hash logic to generate a cryptographic hash as the first checksum, and in which the circuity includes a message authentication code (MAC) unit to generate a MAC as the second checksum.

Example 6 includes the apparatus of Example 5, in which the MAC unit is optionally to generate one selected from a group consisting of a keyed-hash MAC (HMAC), a KECCAK MAC (KMAC), a cipher-based MAC (CMAC), a one-key MAC (OMAC), a cipher block chaining MAC (CBC-MAC), a counter with CBC-MAC (CCM mode), a Galois Counter Mode MAC (GMAC), and a parallelizable MAC (PMAC).

Example 7 includes the apparatus of any one of Examples 1 to 6, in which the circuitry is to generate the first value to have a number of bits that is less than a number of bits of the first checksum plus a number of bits of the second checksum.

Example 8 includes the apparatus of any one of Examples 1 to 6, in which the circuitry is to generate the first value to have a number of bits that is no more than a number of bits of one of the first and second checksums with a largest number of bits.

Example 9 includes the apparatus of any one of Examples 1 to 8, in which the circuitry includes combinational logic to generate the first value, and in which the combinational logic includes one selected from a group consisting of an array of logic gates, an adder, and a subtractor.

Example 10 includes the apparatus of any one of Examples 1 to 9, in which the circuitry includes an array of logic gates to generate the first value.

Example 11 includes the apparatus of any one of Examples 1 to 10, in which the circuitry includes an array of exclusive OR (XOR) gates to generate the first value.

Example 12 includes the apparatus of any one of Examples 1 to 11, further including a decryption unit to receive the encrypted data. The decryption unit is to decrypt the encrypted data to generate unencrypted data. The apparatus further includes second circuitry to: generate a third checksum for a copy of the encrypted data that is decrypted; generate a fourth checksum for a copy of the unencrypted data that is generated by said decrypting the encrypted data;

combine the third and fourth checksums to generate a second value; and compare the first value and the second value.

Example 13 includes the apparatus of Example 12 in which the second circuitry includes a third checksum unit to receive the copy of the encrypted data being provided to the decryption unit. The third checksum unit is to generate the third checksum. The second circuitry also includes a fourth checksum unit coupled with an output of the decryption unit to receive the copy of the unencrypted data generated by the decryption unit. The fourth checksum unit is to generate the fourth checksum. The second circuitry also includes combinational logic coupled with an output of the third checksum unit to receive the third checksum, and coupled with an output of the fourth checksum unit to receive the fourth checksum. The combinational logic is to combine the third and fourth checksums to generate the second value. The second circuitry also includes comparator logic coupled to receive the first value and coupled with an output of the combinational logic to receive the second value. The comparator logic is to compare the first and second values. Optionally, the second circuitry or the comparator logic may cause an error indication to be provided if the first and second values don't match or aren't consistent.

Example 14 includes the apparatus of any one of Examples 1 to 13, in which the second circuitry is to use at least some cryptographic information to generate the first checksum, and in which the second circuitry is coupled with the encryption unit to receive the cryptographic information.

Example 15 includes the apparatus of any one of Examples 1 to 14, further including a memory controller optionally including the apparatus, and optionally in which the memory controller is to store the encrypted data and the first value in a memory.

Example 16 is a method including encrypting unencrypted data to generate encrypted data. The method also includes generating a first checksum for a copy of the unencrypted data, and generating a second checksum for a copy of the encrypted data. The method also includes combining the first and second checksums to generate a first value.

Example 17 includes the method of Example 16, in which said generating the first checksum comprises generating one selected from a group consisting of one or more parity bits, a cyclic redundancy check (CRC), and a cryptographic hash.

Example 18 includes the method of any one of Examples 16 and 17, in which said generating the second checksum comprises generating a message authentication code (MAC).

Example 19 includes the method of any one of Examples 16 and 18, in which said combining the first and second checksums to generate the first value comprises one of performing a logical operation on the first and second checksums, adding the first and second checksums, and subtracting the first and second checksums.

Example 20 includes the method of any one of Examples 16 and 19, in which said generating the first checksum comprises using at least some encrypted information to generate the first checksum.

Example 21 includes the method of any one of Examples 16 and 20, further including storing the encrypted data and the first value in a memory.

Example 22 includes the method of any one of Examples 16 and 21, further including decrypting the encrypted data to generate unencrypted data, generating a third checksum for a copy of the encrypted data that is decrypted, generate a fourth checksum for a copy of the unencrypted data that is generated by said decrypting the encrypted data. The method also optionally including combining the third and fourth checksums to generate a second value. The method also optionally including comparing the first value and the second value. The method also optionally including providing an error indication if the first and second values are not equal.

Example 23 is a system including a central processing unit (CPU) to execute an instruction to store unencrypted data to memory, and a memory controller coupled with the CPU. The memory controller including an encryption unit, a first checksum unit, a second checksum unit, and combinational logic. The encryption unit is to receive the unencrypted data, and is to encrypt the unencrypted data to generate encrypted data. The first checksum unit is to receive a copy of the unencrypted data, and is to generate a first checksum for the copy of the unencrypted data. The second checksum unit is coupled with an output of the encryption unit to receive a copy of the encrypted data, and is to generate a second checksum for the copy of the encrypted data. The combinational logic is coupled with an output of the first checksum unit to receive the first checksum, and is coupled with an output of the second checksum unit to receive the second checksum, and is to combine the first and second checksums to generate a first value. The system also includes a dynamic random access memory (DRAM) coupled with the memory controller. The DRAM is to store the encrypted data and the first value.

Example 24 includes the system of Example 23, in which the memory controller further comprises a decryption unit, a third checksum unit, a fourth checksum unit, a combinational logic, and a comparator logic. The decryption unit is to receive the encrypted data, and is to decrypt the encrypted data to generate unencrypted data. The third checksum unit is to receive a copy of the encrypted data being provided to the decryption unit, and is to generate a third checksum for the copy of the encrypted data being provided to the decryption unit. The fourth checksum unit is coupled with an output of the decryption unit to receive a copy of the unencrypted data generated by the decryption unit, and is to generate a fourth checksum for the copy of the unencrypted data generated by the decryption unit. The combinational logic is coupled with an output of the third checksum unit to receive the third checksum, and is coupled with an output of the fourth checksum unit to receive the fourth checksum, and is to combine the third and fourth checksums to generate a second value. The comparator logic to receive the first value and coupled with an output of the combinational logic to receive the second value, the comparator logic to compare the first and second values.

Example 25 includes the apparatus of any one of Examples 1 to 15 optionally in which the apparatus is included on a system-on-a-chip (SoC) and coupled with at least one additional component. The additional component is selected from a group consisting of a core, an input and/or output (I/O) network controller, a co-processor, a SATA controller, an Ethernet controller, a PCIe controller, a RAID controller, a graphics processing unit (GPU), and a digital signal processor (DSP).

Example 26 includes the apparatus of any one of Examples 1 to 15 optionally incorporated into a system including at least one additional component selected from a group consisting of a memory, a communication device, and a mass storage device.

Example 27 is an error resilient encryption unit or other apparatus operative to perform the method of any one of Examples 16 to 22.

Example 28 is an error resilient encryption unit or other apparatus that includes means for performing the method of any one of Examples 16 to 22.

Example 29 is an error resilient encryption unit or other apparatus that includes any combination of modules and/or units and/or logic and/or components and/or circuitry and/or means operative to perform the method of any one of Examples 16 to 22.

Example 30 is an error resilient decryption unit or other apparatus including a decryption unit to receive the encrypted data. The decryption unit is to decrypt the encrypted data to generate unencrypted data. The apparatus further includes second circuitry to: generate a first checksum for a copy of the encrypted data being provided to the decryption unit; generate a second checksum for a copy of the unencrypted data generated by the decryption unit; combine the first and second checksums to generate a second value; and compare the first and second values.

Example 31 includes the apparatus of Example 30, in which second circuitry includes a first checksum unit to receive the copy of the encrypted data being provided to the decryption unit and generate the first checksum. The second circuitry also includes a second checksum unit coupled with an output of the decryption unit to receive the copy of the unencrypted data generated by the decryption unit and generate the second checksum. The second circuitry also includes combinational logic coupled with an output of the first checksum unit to receive the first checksum, and coupled with an output of the second checksum unit to receive the second checksum. The combinational logic is to combine the first and second checksums to generate the second value. The second circuitry also includes comparator logic coupled to receive a first value and coupled with an output of the combinational logic to receive the second value. The comparator logic is to compare the first and second values.

Example 32 includes the apparatus of any one of Examples 30 to 31, in which the second circuitry comprises one selected from a group consisting of a parity bit generation logic to generate one or more parity bits as the first checksum, a cyclic redundancy check (CRC) logic to generate a CRC as the first checksum, and a cryptographic hash logic to generate a cryptographic hash as the first checksum, and in which the second circuitry includes a message authentication code (MAC) unit to generate a MAC as the second checksum.

Example 33 includes the apparatus of any one of Examples 30 to 32, in which the second circuitry is to generate the second value to have a number of bits that is less than a number of bits of the first checksum plus a number of bits of the second checksum.

Example 34 includes the apparatus of any one of Examples 30 to 33, in which the second circuitry is to generate the second value to have a number of bits that is no more than a number of bits of one of the first and second checksums with a largest number of bits.

Example 35 includes the apparatus of any one of Examples 30 to 34, in which the second circuitry includes one selected from a group consisting of an array of logic gates, an adder, and a subtractor to generate the second value.

Example 36 includes the apparatus of any one of Examples 30 to 35, in which the second circuitry includes an array of logic gates to generate the second value.

Example 37 includes the apparatus of any one of Examples 30 to 36, in which the second circuitry includes an array of exclusive OR (XOR) gates to generate the second value.

Example 38 includes the apparatus of any one of Examples 30 to 37, further including a memory controller optionally including the apparatus, in which the memory controller is optionally to store the encrypted data and the first value in a memory.

Example 39 is an apparatus including an encryption unit to encrypt unencrypted data to generate encrypted data. The apparatus also includes means for generating a first checksum for a copy of the unencrypted data, means for generating a second checksum for a copy of the encrypted data, and means for combining the first and second checksums to generate a first value.

Example 40 is an apparatus including an encryption unit to encrypt unencrypted data to generate encrypted data. The apparatus also includes circuitry or other logic to generate a first checksum for a copy of the unencrypted data, circuitry or other logic to generate a second checksum for a copy of the encrypted data, and circuitry or other logic to combine the first and second checksums to generate a first value.

What is claimed is:

1. An apparatus comprising:
   an encryption circuitry to receive unencrypted data, the encryption circuitry to encrypt the unencrypted data to generate encrypted data;
   first circuitry coupled with the encryption circuitry, the first circuitry to:
     generate a first checksum for a copy of the unencrypted data;
     generate a second checksum for a copy of the encrypted data; and
     combine the first and second checksums to generate a first value;
   a decryption circuitry to receive the encrypted data, the decryption circuitry to decrypt the encrypted data to generate unencrypted data; and
   second circuitry to:
     generate a third checksum for a copy of the encrypted data that is decrypted;
     generate a fourth checksum for a copy of the unencrypted data that is generated by said decrypting the encrypted data;
     combine the third and fourth checksums to generate a second value; and
     compare the first value and the second value.

2. The apparatus of claim 1, wherein the first circuitry comprises:
   a first checksum circuitry to generate the first checksum;
   a second checksum circuitry coupled with an output of the encryption circuitry, the second checksum circuitry to generate the second checksum; and
   combinational logic coupled with an output of the first checksum circuitry to receive the first checksum, and coupled with an output of the second checksum circuitry to receive the second checksum, the combinational logic to combine the first and second checksums to generate the first value.

3. The apparatus of claim 1, wherein the first circuitry comprises one selected from a group consisting of a parity bit generation logic to generate one or more parity bits as the first checksum, a cyclic redundancy check (CRC) logic to generate a CRC as the first checksum, and a cryptographic hash logic to generate a cryptographic hash as the first checksum.

4. The apparatus of claim 1, wherein the first circuitry comprises a message authentication code (MAC) circuitry to generate a MAC as the second checksum.

5. The apparatus of claim 1, wherein the first circuitry is to generate the first value to have a number of bits that is no more than a number of bits of one of the first and second checksums with a largest number of bits.

6. The apparatus of claim 1, wherein the first circuitry comprises combinational logic to generate the first value, and wherein the combinational logic comprises one selected from a group consisting of an array of logic gates, an adder, and a subtractor.

7. The apparatus of claim 1, wherein the first circuitry comprises an array of exclusive OR (XOR) gates to generate the first value.

8. The apparatus of claim 1, wherein the second circuitry comprises:
a third checksum circuitry to receive the copy of the encrypted data being provided to the decryption circuitry, the third checksum circuitry to generate the third checksum;
a fourth checksum circuitry coupled with an output of the decryption circuitry to receive the copy of the unencrypted data generated by the decryption circuitry, the fourth checksum circuitry to generate the fourth checksum;
combinational logic coupled with an output of the third checksum circuitry to receive the third checksum, and coupled with an output of the fourth checksum circuitry to receive the fourth checksum, the combinational logic to combine the third and fourth checksums to generate the second value; and
comparator logic coupled to receive the first value and coupled with an output of the combinational logic to receive the second value, the comparator logic to compare the first and second values.

9. The apparatus of claim 1, further comprising a memory controller, wherein the memory controller is to store the encrypted data and the first value in a memory.

10. An apparatus comprising:
an encryption circuitry to receive unencrypted data, the encryption circuitry to encrypt the unencrypted data to generate encrypted data; and
circuitry coupled with the encryption circuitry, the circuitry to:
generate a first checksum for a copy of the unencrypted data, wherein the circuitry is to use at least some cryptographic information to generate the first checksum, and wherein the cryptographic information includes at least one of address information associated with the unencrypted data and one or more bits but not all bits of a key used to encrypt the unencrypted data to generate the encrypted data;
generate a second checksum for a copy of the encrypted data; and
combine the first and second checksums to generate a first value.

11. The apparatus of claim 10, wherein the circuitry comprises:
one selected from a group consisting of a parity bit generation logic to generate one or more parity bits as the first checksum, a cyclic redundancy check (CRC) logic to generate a CRC as the first checksum, and a cryptographic hash logic to generate a cryptographic hash as the first checksum; and
a message authentication code (MAC) circuitry to generate a MAC as the second checksum.

12. The apparatus of claim 11, wherein the MAC circuitry is to generate one selected from a group consisting of a keyed-hash MAC (HMAC), a KECCAK MAC (KMAC), a cipher-based MAC (CMAC), a one-key MAC (OMAC), a cipher block chaining MAC (CBC-MAC), a counter with CBC-MAC (CCM mode), a Galois Counter Mode MAC (GMAC), and a parallelizable MAC (PMAC).

13. The apparatus of claim 10, wherein the circuitry is to generate the first value to have a number of bits that is less than a number of bits of the first checksum plus a number of bits of the second checksum.

14. The apparatus of claim 10, wherein the circuitry comprises an array of logic gates to generate the first value.

15. An apparatus comprising:
a decryption circuitry to receive encrypted data and a first value, the decryption circuitry to decrypt the encrypted data to generate unencrypted data;
a first checksum circuitry to receive a copy of the encrypted data, the first checksum circuitry to generate a first checksum for the copy of the encrypted data;
a second checksum circuitry coupled with an output of the decryption circuitry to receive a copy of the unencrypted data, the second checksum circuitry to generate a second checksum for the copy of the unencrypted data;
combinational logic coupled with an output of the first checksum circuitry to receive the first checksum, and coupled with an output of the second checksum circuitry to receive the second checksum, the combinational logic to combine the first and second checksums to generate a second value; and
comparator logic to receive the first value and coupled with an output of the combinational logic to receive the second value, the comparator logic to compare the first and second values, wherein the comparator logic is to associate a poison indication with the unencrypted data when the first and second values do not match.

16. The apparatus of claim 15, wherein the second checksum circuitry is to generate a message authentication code (MAC) as the second checksum.

17. The apparatus of claim 16, wherein the first checksum circuitry is to generate a cyclic redundancy check (CRC) value as the first checksum.

18. The apparatus of claim 16, wherein the combinational logic comprises an array of exclusive OR (XOR) gates to generate the second value.

* * * * *